(12) United States Patent
Xin

(10) Patent No.: US 9,675,184 B2
(45) Date of Patent: Jun. 13, 2017

(54) SPIRAL EXHIBITION HANGER HAVING TIME DELAY MECHANISM AND CAPABLE OF ALLOWING COMMODITIES TO BE PLACED ON OR TAKEN DOWN

(71) Applicant: Hangzhou Langhong Technology Co., Ltd, HangZhou (CN)

(72) Inventor: Hong Xin, HangZhou (CN)

(73) Assignee: Hangzhou Langhong Technology Co., Ltd, Hangzhou (CN)

( * ) Notice: Subject to any disclaimer, the term of this patent is extended or adjusted under 35 U.S.C. 154(b) by 0 days.

(21) Appl. No.: 14/892,457

(22) PCT Filed: May 12, 2015

(86) PCT No.: PCT/CN2015/078719
§ 371 (c)(1),
(2) Date: Nov. 19, 2015

(87) PCT Pub. No.: WO2016/015507
PCT Pub. Date: Feb. 4, 2016

(65) Prior Publication Data
US 2016/0227942 A1    Aug. 11, 2016

(30) Foreign Application Priority Data

Jul. 28, 2014  (CN) .................... 2014 2 0418585 U

(51) Int. Cl.
*A47F 1/04* (2006.01)
*A47F 7/00* (2006.01)
(Continued)

(52) U.S. Cl.
CPC ............ *A47F 1/128* (2013.01); *A47F 5/0006* (2013.01); *A47F 5/0861* (2013.01); *F16H 1/20* (2013.01)

(58) Field of Classification Search
CPC ...... A47F 5/0861; A47F 1/128; A47F 5/0869; A47F 5/0006
See application file for complete search history.

(56) References Cited

U.S. PATENT DOCUMENTS 4,308,974 A * 1/1982 Jones .................... A61F 15/001
                                                      221/196
4,600,119 A * 7/1986 Olson .................... G07F 11/42
                                                      221/154
(Continued)

FOREIGN PATENT DOCUMENTS

CN    101578422    11/2009
CN    202023435    11/2011
(Continued)

OTHER PUBLICATIONS

International Search Report, issued in the corresponding international PCT application No. PCT/CN2015/078719, dated Aug. 20, 2015, 4 pages.

*Primary Examiner* — Leslie A Nicholson, III
*Assistant Examiner* — Kimberley S Wright
(74) *Attorney, Agent, or Firm* — Hamre, Schumann, Mueller & Larson, P.C.

(57) ABSTRACT

The utility model discloses a spiral display hanger having a time delay mechanism and capable of allowing commodities to be placed on or taken down, comprising a supporting arm, a spiral pipe, a time delay mechanism and a handle. A torque output shaft is provided on the time delay mechanism. The supporting arm comprises an upper supporting rod and a lower supporting rod, one end of the upper supporting rod being rotationally connected to a rotation center of the torque output shaft and the other end of the upper supporting rod being securely provided on a fixture, and one end of the lower supporting rod being also secured on the fixture and the other end of the lower supporting rod being a free end.

(Continued)

One end of the spiral pipe is fixedly connected to the torque output shaft. The upper supporting and the lower supporting rod are penetrated through the spiral pipe to come into contact with the spiral pipe. The handle and the torque output shaft are in transmission connection with the time delay mechanism, respectively. In the utility model, commodities to be exhibited are hung in a sealed manner by turns of the spiral pipe. This increases the coefficient of difficulty and risk of stealing those commodities and thus provides for good anti-theft effect; and for businesses, the retail staff can conveniently place and take commodities on or down the hanger simply by rotating the handle, without requiring any specialized tool.

5 Claims, 2 Drawing Sheets

(51) Int. Cl.
*A47F 1/12* (2006.01)
*A47F 5/00* (2006.01)
*F16H 1/20* (2006.01)
*A47F 5/08* (2006.01)

(56) References Cited

U.S. PATENT DOCUMENTS

| | | | | |
|---|---|---|---|---|
| 4,638,922 A * | 1/1987 | Stoltz | ............... | G07F 11/42 221/281 |
| 5,114,021 A * | 5/1992 | Fredrickson | ............ | A47F 1/121 211/54.1 |
| 5,222,608 A * | 6/1993 | Eklof | ................ | A47F 5/0869 211/54.1 |
| 6,659,291 B2 * | 12/2003 | Huehner | ............... | A47F 5/0861 211/4 |
| 7,197,902 B1 * | 4/2007 | Barkdoll | ............... | A47F 5/0861 211/57.1 |
| 7,392,673 B2 * | 7/2008 | Fawcett | ................ | A47F 5/0861 211/7 |
| 7,533,784 B2 * | 5/2009 | Vlastakis | ............... | A47F 5/0861 221/151 |
| 7,559,437 B2 * | 7/2009 | Colelli | ................... | G07G 3/003 211/1 |
| 8,523,012 B2 * | 9/2013 | Richardson | ........... | A47F 5/0861 211/51 |
| 8,684,227 B2 * | 4/2014 | Richardson | ........... | A47F 5/0861 211/51 |
| 2003/0029816 A1 * | 2/2003 | Huehner | ............... | A47F 5/0861 211/7 |
| 2004/0084386 A1 * | 5/2004 | Huehner | ............... | A47F 5/0861 211/4 |
| 2007/0283615 A1 * | 12/2007 | Vlastakis | ............... | A47F 5/0861 43/55 |
| 2009/0173853 A1 * | 7/2009 | Fawcett | ................ | A47F 5/0861 248/220.31 |
| 2009/0184129 A1 * | 7/2009 | Vlastakis | ............... | A47F 5/0861 221/15 |
| 2010/0223965 A1 * | 9/2010 | Richardson | ........... | A47F 5/0861 70/58 |
| 2010/0280655 A1 * | 11/2010 | Wilson | .................... | G07F 11/42 700/231 |
| 2011/0036789 A1 * | 2/2011 | Richardson | ........... | A47F 5/0861 211/1.57 |
| 2011/0127225 A1 * | 6/2011 | Hooks, Jr. | ............. | A47F 5/0861 211/1.57 |
| 2012/0253508 A1 * | 10/2012 | Holmes | ................... | A47F 1/128 700/232 |
| 2013/0105418 A1 * | 5/2013 | Northrup, Jr. | ........ | A47F 5/0861 211/4 |
| 2013/0105419 A1 * | 5/2013 | Kologe | ................. | A47F 5/0861 211/7 |
| 2014/0352372 A1 * | 12/2014 | Grant | .................... | A47F 5/0861 70/57.1 |
| 2015/0096998 A1 * | 4/2015 | Bird | ...................... | A47F 5/0861 221/1 |

FOREIGN PATENT DOCUMENTS

| | | |
|---|---|---|
| CN | 203987189 | 12/2014 |
| JP | 08140790 | 6/1996 |
| JP | 2004215700 | 8/2004 |
| JP | 3875953 | 1/2007 |

* cited by examiner

SPIRAL EXHIBITION HANGER HAVING TIME DELAY MECHANISM AND CAPABLE OF ALLOWING COMMODITIES TO BE PLACED ON OR TAKEN DOWN

TECHNICAL FIELD OF THE UTILITY MODEL

The utility model relates to an exhibition hanger for preventing commodities against theft, more particularly to a spiral exhibition hanger having a time delay mechanism and capable of allowing commodities to be placed on or taken down.

BACKGROUND OF THE UTILITY MODEL

At present, an exhibition hanger preventing commodities against theft in the retail environment is independently mounted on exhibited furniture of various specifications, and the hanger provides an exhibition area of commodities for potential customers to observe or experience the commodities. However, due to the limitation of design, an existing anti-theft exhibition hanger usually has a conflict of safety and convenience. If an exhibition opening end of the hanger is open, precious commodities in exhibition are likely to be all stolen in some circumstances. In order to solve such circumstances, for some hangers, a demountable stopper may be added to the exhibition opening end to prevent the commodities from being taken down without permission. However, this brings the inconvenience that commodities may be taken down only in aid of a specialized tool under the help of the retail staff. In doing so, although the possibility of theft of commodities is decreased, the difficulty for the potential customers to experience and purchase commodities is increased, which significantly influences the experience of the customers. Moreover, the missing of the specialized tool will bring inconvenience to the exhibition of the commodities.

SUMMARY OF THE UTILITY MODEL

There is a conflict between safety and convenience of an existing anti-theft exhibition hanger. One of the two aspects will be enhanced at the cost of the other aspect. In order to solve this problem, the utility model provides a spiral exhibition hanger having a time delay mechanism and capable of allowing commodities to be placed on or taken down, which has good anti-theft performance and is easy in operation, and thus integrates both safety and convenience.

The utility model employs the following technical solution: a spiral exhibition hanger having a time delay mechanism and capable of allowing commodities to be placed on or taken down is provided, including a supporting arm, a spiral pipe, a time delay mechanism and a handle rotating in only one direction; a torque output shaft is provided on the time delay mechanism; the supporting arm includes an upper supporting rod and a lower supporting rod, one end of the upper supporting rod being connected to a time delay mechanism and the other end of the upper supporting rod being securely provided on a fixture, and one end of the lower supporting rod being fixedly connected to the upper supporting rod and the other end of the lower supporting rod being a free end; one end of the spiral pipe is fixedly connected to the torque output shaft; the upper supporting rod and the lower supporting rod are penetrated through the spiral pipe to come into contact with the spiral pipe; and the handle and the torque output shaft are in transmission connection with the time delay mechanism, respectively.

The upper supporting rod is used for supporting the entire spiral exhibition hanger, and the upper supporting rod is connected to the fixture through its own mounting structure to secure the spiral exhibition hanger on an orifice plate or exhibited furniture in other forms. The lower supporting rod is used for hanging the commodities to be exhibited. There is a certain gap, for receiving at least one commodity to be exhibited, between turns of the spiral pipe. The commodities exhibited are placed on the hanger from the free end of the lower supporting rod, and then the handle is rotated in a specified direction to run the time delay mechanism; a torque is output by the torque output shaft to drive the spiral pipe to rotate, and the rotation of the spiral pipe is in turn translated into conduction by threads, so that the commodities to be exhibited are pushed inward along the lower supporting rod until coming deeply into the lower supporting rod, and now an exit path of the commodities to be exhibited is blocked by the turns of the spiral pipe. In this way, a plurality of commodities to be exhibited may be placed on the hanger one by one or group by group, and spaced apart from each one or each group between the turns of the spiral pipe, and then hung on the lower supporting rod. If it is to take down the commodities in exhibition, the spiral pipe is rotated in a reverse direction, and the commodities in exhibition are pushed to the free end of the lower supporting rod one by one or group by group in a reverse order. Since it needs a certain period of time to take the commodities down, the commodities will not be stolen within a short period of time. This increases the coefficient of difficulty and risk of stealing those commodities and thus provides for good anti-theft effect. For businesses, the retail staff can conveniently place and take commodities on or down the hanger simply by rotating the handle, without requiring any specialized tool, and the operation is very convenient. Therefore, the spiral exhibition hanger integrates both safety and convenience.

Preferably, the time delay mechanism includes a shell, a spiral gear, a loading gear capable of engaging with the spiral gear, a driven gear and an unloading gear capable of engaging with the driven gear; a handle rotating shaft is provided on the handle, and the handle rotating shaft further has a degree of freedom of axial sliding; both the unloading gear and the loading gear are coaxially sleeved on the handle rotating shaft and fixedly connected to the handle rotating shaft; at the same time, only one of the driven gear and the loading gear is engaged with the spiral gear; the driven gear is rotationally connected to a spacer in the shell, and the torque output shaft is rotationally connected to the shell and fixedly connected to the spiral gear. Since the handle rotating shaft may slide axially, the unloading gear and the loading gear may be switched to be in a transmission connection with the spiral gear. At the same time, the spiral may come into transmission connection with only one of the unloading gear and the loading gear. The unloading gear, the driven gear and the spiral gear form a transmission path, when the unloading gear moves to a position where the unloading gear is engaged with the driven gear. The spiral gear drives the spiral pipe through the torque output shaft to rotate inversely to push the commodities in exhibition to the free end of the lower supporting rod, when the handle is rotated, so as to take down the commodities in exhibition. The loading gear comes into transmission with the spiral gear, when the loading gear reaches a position where the loading gear is engaged with the spiral gear. The spiral gear drives the spiral pipe through the torque output shaft to rotate forwardly to push the commodities in exhibition from the free end of the lower supporting rod toward a fixed end thereof, when the handle is rotated.

Preferably, a switching device positioned between the handle and the unloading gear is slidingly connected to the shell; a retaining plate is fixedly connected to the switching device, and a slot, matched with the diameter of the handle rotating shaft and capable of being clamped on a peripheral surface of the handle rotating shaft, is provided on the retaining plate; a spring is provided on a free end of the retaining plate, and the spring is connected to the spacer in the shell; and a limiting ring is secured on the handle rotating shaft. In a normal state, the switching device is in an initial position due to the elasticity of the spring. In this case, the limiting ring is blocked by the slot, one side of the handle rotating shaft in the axial direction is at a limiting position so that it can not move forward or backward, and at this moment, the unloading gear is in transmission connection with the spiral gear. After the switching device is pressed down, the locking between the slot and the limiting ring of the handle rotating shaft is released and the axial resistance of the handle rotating shaft is eliminated. In this case, the handle may move axially, and in turn the loading gear comes into engagement with the spiral gear. With the arrangement of the switching device, a position for each of the loading gear and the unloading gear to be in transmission with the spiral gear may be found conveniently and accurately.

Preferably, the diameter of the unloading gear is smaller than that of the loading gear. In this way, when the handle is rotated at a same speed, the inverse speed of the spiral pipe is smaller than the forward speed thereof. As a result of this, it will need much more time to take down the commodities in exhibition than to place commodities to be exhibited on the hanger. It is thus more difficult for thefts to steal those commodities in exhibition and more convenient for the retail staff to place the commodities to be exhibited on the hanger.

Preferably, the spiral exhibition hanger further includes a spiral pipe guard erected above the spiral pipe, and the spiral pipe guard is clamped with the shell. The spiral pipe guard may prevent a top end of the commodities to be exhibited from being damaged, improve the appearance, and provide ancillary supporting.

Preferably, there is a label slot provided between the time delay mechanism and the handle. The label slot may be used for hanging the label for commodities.

The utility model has the following beneficial effects.

The spiral exhibition hanger of the utility model has good anti-theft performance and is easy in operation. In the utility model, commodities to be exhibited are hung in a sealed manner by the turns of the spiral pipe. It will need much more time to take down the commodities in exhibition than to place commodities to be exhibited on the hanger. This increases the coefficient of difficulty and risk of stealing those commodities and thus provides for good anti-theft effect; and for businesses, the retail staff can conveniently place and take commodities on or down the hanger simply by rotating the handle, without requiring any specialized tool, and the operation is very easy.

BRIEF DESCRIPTION OF THE DRAWINGS

FIG. 4 is a schematic diagram of the utility model when in use, in which:

1: spiral pipe;
2: time delay mechanism;
3: handle;
4: upper supporting rod;
5: lower supporting rod;
6: torque output shaft;
7: shell;
8: spiral gear;
9: unloading gear;
10: loading gear;
11: driven gear;
12: handle rotating shaft;
13: switching device;
14: retaining plate;
15: spring;
16: spiral pipe guard;
17: mounting feet;
18: label;
19: mounting hood.

DETAILED DESCRIPTION OF THE INVENTION

The utility model will be further described as below with reference to the accompany drawings by specific embodiments.

Embodiment 1

Figure 1:
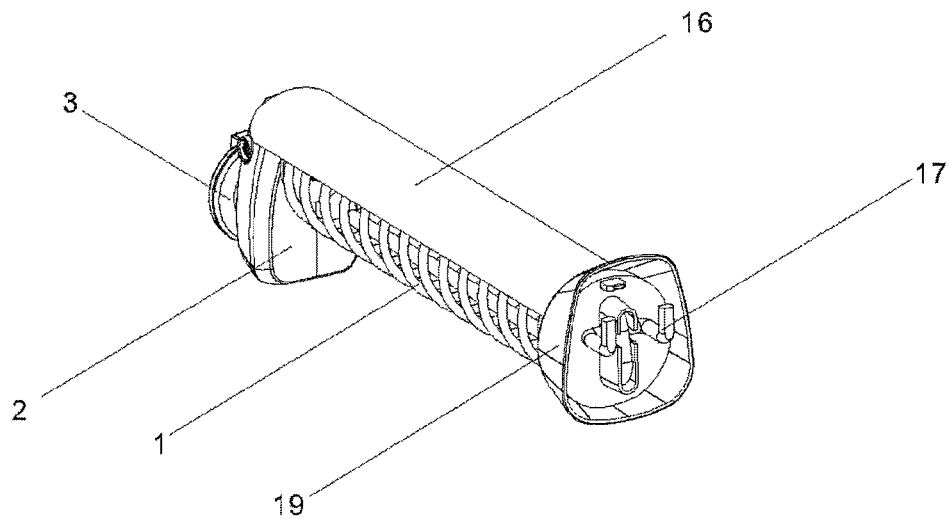
FIG. 1 is a schematically structural diagram of the utility model.
Figure 2:
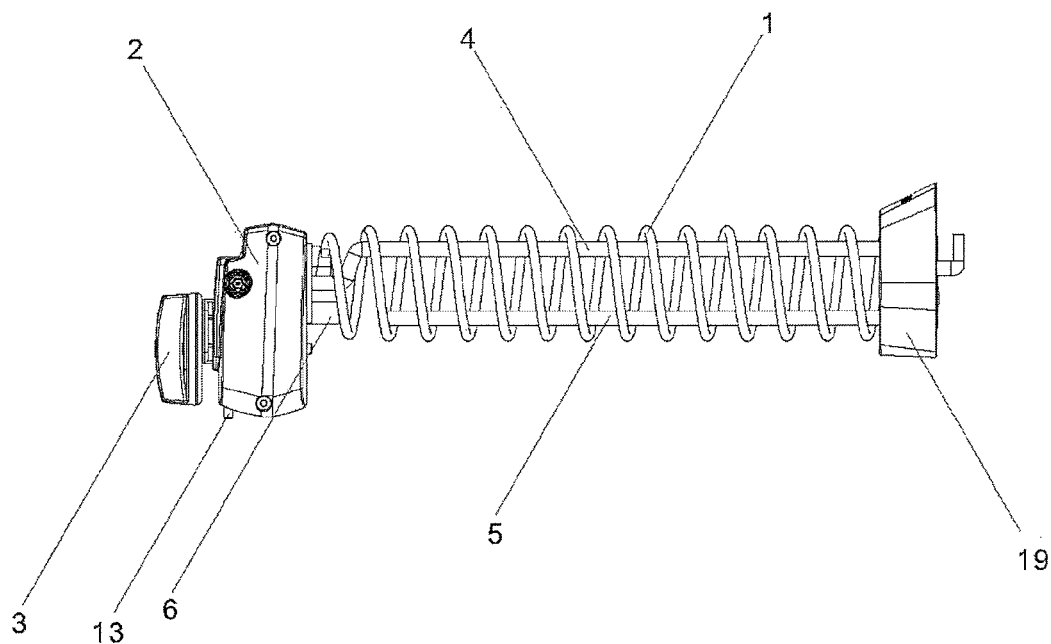
FIG. 2 is another schematically structural diagram of the utility model.
Figure 3:
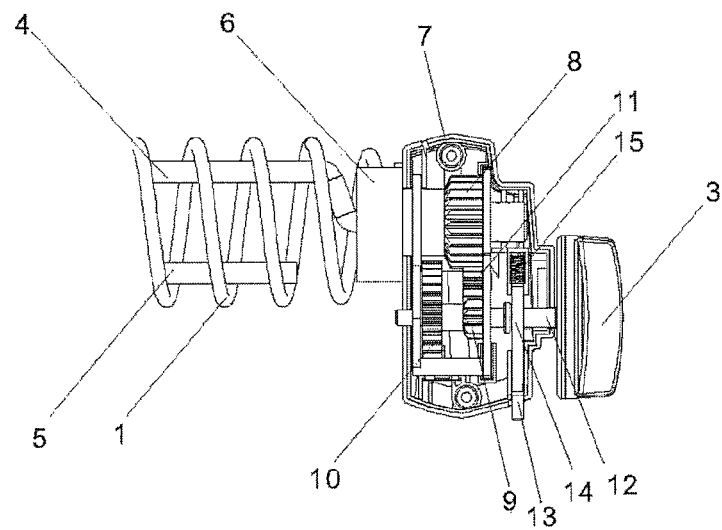
FIG. 3 is a schematically structural diagram of the interior of a time delay mechanism of the utility model.
Figure 4:
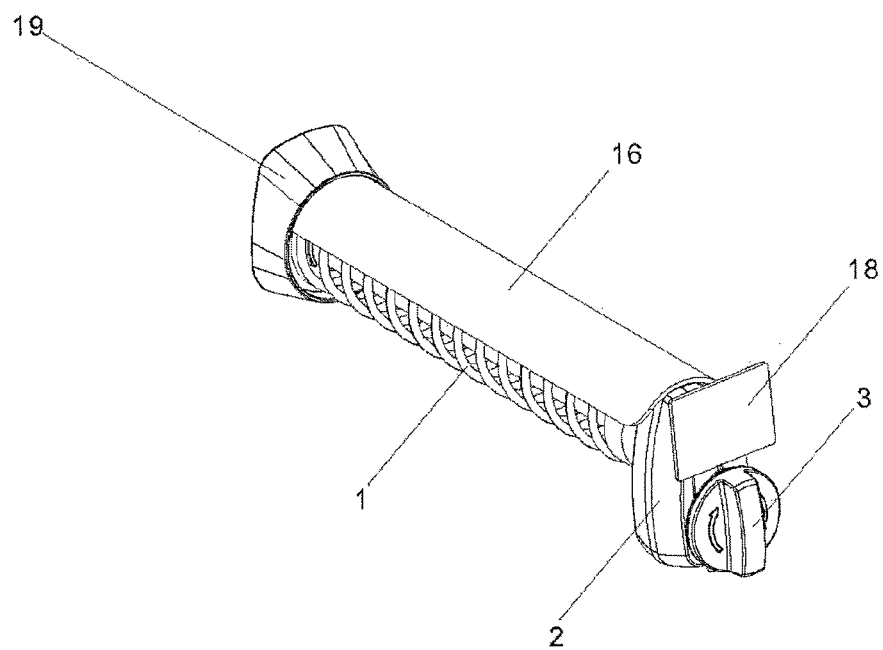

As shown in FIG. 1 to FIG. 4, a spiral exhibition hanger having a time delay mechanism and capable of allowing commodities to be loaded on or taken down is provided, including a supporting arm, a spiral pipe 1, a time delay mechanism 2 and a handle 3 rotating in only one direction. A torque output shaft 6 is provided on the time delay mechanism 2, and an axial through hole is provided in a rotation center of the torque output shaft 6. The supporting arm includes an upper supporting rod 4 and a lower supporting rod 5, one end of the upper supporting rod 4 being inserted into the axial through hole to realize rotational connection with the rotation center of the torque output shaft 6, and being secured in the interior of the time delay mechanism 2. A pair of L-shaped mounting feet 17 is provided at the other end of the upper supporting rod 4, and the upper supporting rod 4 is secured on furniture to be exhibited through the mounting feet 17. One end of the lower supporting rod 5 is fixedly connected to the upper supporting rod 4 and the other end of the lower supporting rod 5 is a free end. A mounting hood 19 is provided at fixed ends of the upper supporting rod 4 and the lower supporting rod 5, to cover the fixed ends of the upper supporting rod 4 and the lower supporting rod 5. One end of the spiral pipe 1 is fixedly connected to the torque output shaft 6, and the upper supporting rod 4 and the lower supporting rod 5 are penetrated through the spiral pipe 1 to come into contact with the spiral pipe 1. The time delay mechanism 2 includes a shell 7, a spiral gear 8, a loading gear 10 capable of engaging with the spiral gear 8, a driven gear 11 and an unloading gear 9 capable of engaging with the driven gear 11. A handle rotating shaft 12 is provided on the handle 3, the handle rotating shaft 12 is penetrated through both sides of the shell 7 and rotationally connected to the shell 7, and the handle rotating shaft 12 further has a degree of freedom of axial sliding. Both the unloading gear 9 and the loading gear 10 are coaxially sleeved on the handle rotating shaft 12 and are in key connection with the handle rotating shaft 12. The torque output shaft 6 is positioned outside the shell 7, rotationally connected to and penetrated through a round hole formed on the shell 7, and integrated with the spiral gear 8, thus to enable the handle 3 and the torque output shaft 6 to come into transmission connection with the time delay mechanism 2, respectively. A rotation stopping pin is provided under the shell 7, and the rotation stopping pin is collaborated with the loading gear 10 to realize the rotation in one direction of the handle 3 and to prevent the handle 3 from rotating inversely. An end, opposite to a fixed end of the mounting feet, of the upper supporting rod 4 extends into the shell 7 after the being inserted into the torque output shaft 6 and the center of the spiral gear 8. A screw via is formed on the shell 7. A recess is formed on a peripheral surface of an end, opposite to the fixed end of the mounting feet, of the upper supporting rod 4. The time delay mechanism 2 may be fixedly connected to the upper supporting rod 4 by passing a screw through the screw via and then threading into the recess on the upper supporting rod 4. The thickness of both the driven gear 11 and the loading gear 10 is half of that of the spiral gear 8, and the distance from the unloading gear 9 to the loading gear 10 is a half of the thickness of the spiral gear 8. The driven gear 11 is rotationally connected to a spacer in the shell 7, and the driven gear 11 is offset on one side of the spiral gear 8 and always engaged with half of the spiral gear 8. A switching device 13 positioned between the handle 3 and the unloading gear 9 is slidingly connected to the shell 7. A retaining plate 14 is fixedly connected to the switching device 13, and a slot, matched with the diameter of the handle rotating shaft 12 and capable of being clamped on a peripheral surface of the handle rotating shaft 12, is provided on the retaining plate 14. A spring 15 is provided at a free end of the retaining plate 14, and the spring 15 is connected to the spacer in the shell 7. A limiting ring is secured on the handle rotating shaft 12. The diameter of the unloading gear 9 is smaller than that of the loading gear 10, so that the speed to place commodities on the lower supporting rod 5 is higher than the speed to take the commodities down from the lower supporting rod 5. The exhibition hanger further includes a transparent spiral pipe guard 16 erected above the spiral pipe 1, and both ends of the spiral pipe guard 16 are clamped with the shell 7 and the mounting hood 19, respectively. There is a label slot, used for hanging a label 18 having specifications of the commodities written thereon, provided between the time delay mechanism 2 and the handle 3.

The time delay mechanism 2 is used for increasing the time required to take down the commodities in exhibition, while allowing the remaining commodities in exhibition on the hanger to be exhibited on the spiral exhibition hanger. During mounting the spiral exhibition hanger, the screw on the shell 7 is to be unscrewed by a screwdriver, and then the time delay mechanism 2 and the spiral pipe 1 are removed. At this moment, the mounting hood 19 may be pushed to the bottom along the supporting arm, the mounting feet 17 are slightly tilted upward to pass through a corresponding mounting hole on the furniture to be exhibited. Due to gravity, the spiral exhibition hanger will be entirely secured on the furniture to be exhibited. Subsequently, the spiral pipe 1 and the time delay mechanism 2 are mounted onto the supporting arm again in that order. The screw is tightened, and then the spiral pipe guard 16 is clamped between the mounting hood 19 and the shell 7 of the time delay mechanism 2. At this moment, the spiral exhibition hanger is secured on the furniture to be exhibited. The spiral exhibition hanger is set in the unloading state by default. If it is to switch to the loading state, the switching device 13 is required. When in use, if commodities are to be hung on the spiral exhibition hanger, the commodities are loaded at the free end of the lower supporting rod 5 first, the switching device 13 is then pressed down to move away the retaining plate 14, so that the locking between the slot structure on the retaining plate 14 and the limiting ring is released. Structurally, the commodities are allowed to pass onto the hanger. At this moment, the handle 3 may be pulled outward to the limit. Then, the switching device 13 is released, the retaining plate 14 rebounds to clamp one side of the limiting ring to avoid the retraction of the limiting ring. At this moment, the loading gear 10 is engaged with the spiral gear 8. The handle 3 is rotated to drive the spiral pipe 1, and the rotation of the spiral pipe 1 along with the handle 3 changes the distance of the commodities in exhibition on the lower supporting rod 5. The pitch of the spiral structure 3 is large enough to receive the thickness of a package of the commodities in exhibition and to prevent the commodities in exhibition from being stolen violently. The commodities in exhibition move, by conduction by threads, along the lower supporting rod 5 toward a direction away from the free end. This is repeated to place the commodities to be exhibited on the free end 12 one by one. Theoretically, although a single commodity to be exhibited is loaded on the hanger every time, a specific case where a plurality of ultra-small and ultra-thin commodities to be exhibited is loaded on the hanger simultaneously is possible. And, the handle is rotated in a specified direction repeatedly until commodities to be exhibited are all hung on the lower supporting rod 5. After the commodities to be exhibited are loaded on the hanger, if it needs to switch the loading state to unloading state: the switching device 13 is pressed down again, the spring is compressed, the locking between the slot on the retaining plate 14 and the limiting ring is released, the retaining plate 14 is pushed away, and the handle 3 is pushed inward to the limit, and the switching device 13 is released so that the retaining plate 14 rebounds to clamp the other side of the limiting ring. At this moment, the unloading gear 9 moves to a position where the unloading gear 9 is engaged with the driven gear 11, and the handle 3 can not move axially any more. The unloading gear 9, the driven gear 11 and the spiral gear 8 form a transmission path. The spiral gear 8 drives the spiral pipe 1 through the torque output shaft to rotate inversely, when the handle 3 is rotated. In this way, the commodities in exhibition are pushed to the free end of the lower supporting rod 5 so that they can be easily taken down.

Embodiment 2

One end of the upper supporting rod 4 is rotationally connected to a rotation center of the torque output shaft 6, an expansion bolt is provided at the other end of the upper supporting rod 4, and the upper supporting rod 4 is secured on a wall through the expansion bolt. The remaining is the same as Embodiment 1.

The invention claimed is:
1. A spiral exhibition hanger having a time delay mechanism and capable of allowing commodities to be placed on or taken down, comprising:
 a supporting arm, a spiral pipe, a time delay mechanism and a handle rotating in only one direction; and
 a torque output shaft provided on the time delay mechanism;
 wherein the supporting arm comprises:
  an upper supporting rod and a lower supporting rod, one end of the upper supporting rod being connected to the time delay mechanism and the other end of the upper supporting rod being securely provided on a fixture, one end of the lower supporting rod being fixedly connected to the upper supporting rod, the other end of the lower supporting rod being a free end; and one end of the spiral pipe being fixedly connected to the torque output shaft;

the upper supporting rod and the lower supporting rod being penetrated through the spiral pipe to come into contact with the spiral pipe;

the handle and the torque output shaft being in transmission connection with the time delay mechanism, respectively, wherein the time delay mechanism comprises:

a shell, a spiral gear, a loading gear capable of engaging with the spiral gear, a driven gear, and an unloading gear capable of engaging with the driven gear;

a handle rotating shaft is provided on the handle, and the handle rotating shaft has a degree of freedom of axial sliding;

both the unloading gear and the loading gear are coaxially sleeved on the handle rotating shaft and fixedly connected to the handle rotating shaft;

at the same time, only one of the driven gear and the loading gear is engaged with the spiral gear; and the torque output shaft is rotationally connected to the shell and fixedly connected to the spiral gear; and wherein:

a switching device positioned between the handle and the unloading gear is slidingly connected to the shell;

a retaining plate is fixedly connected to the switching device and is clampable on a peripheral surface of the handle rotating shaft;

a spring is provided at a free end of the retaining plate; and a limiting ring is secured on the handle rotating shaft.

2. The spiral exhibition hanger according to claim 1, wherein the diameter of the unloading gear is smaller than that of the loading gear.

3. The spiral exhibition hanger according to claim 1, further comprising a spiral pipe guard erected above the spiral pipe, and the spiral pipe guard is clamped with the shell.

4. The spiral exhibition hanger according to claim 1, wherein there is a label slot provided between the time delay mechanism and the handle.

5. A spiral exhibition hanger having a time delay mechanism and capable of allowing commodities to be placed on or taken down, comprising:

a supporting arm, a spiral pipe, a time delay mechanism and a handle rotating in only one direction; and a torque output shaft provided on the time delay mechanism;

wherein the supporting arm comprises:

an upper supporting rod and a lower supporting rod, one end of the upper supporting rod being connected to the time delay mechanism and the other end of the upper supporting rod being securely provided on a fixture, one end of the lower supporting rod being fixedly connected to the upper supporting rod, the other end of the lower supporting rod being a free end; and one end of the spiral pipe being fixedly connected to the torque output shaft;

the upper supporting rod and the lower supporting rod being penetrated through the spiral pipe to come into contact with the spiral pipe;

the handle and the torque output shaft being in transmission connection with the time delay mechanism, respectively, wherein the time delay mechanism comprises:

a shell, a spiral gear, a loading gear capable of engaging with the spiral gear, a driven gear, and an unloading gear capable of engaging with the driven gear;

a handle rotating shaft is provided on the handle, and the handle rotating shaft has a degree of freedom of axial sliding;

both the unloading gear and the loading gear are coaxially sleeved on the handle rotating shaft and fixedly connected to the handle rotating shaft;

at the same time, only one of the driven gear and the loading gear is engaged with the spiral gear; and the torque output shaft is rotationally connected to the shell and fixedly connected to the spiral gear, and wherein the diameter of the unloading gear is smaller than that of the loading gear.

* * * * *